US010291713B2

(12) United States Patent
Hou et al.

(10) Patent No.: US 10,291,713 B2
(45) Date of Patent: May 14, 2019

(54) SMART DEVICE CONTROL METHOD AND APPARATUS

(71) Applicant: XIAOMI INC., Beijing (CN)

(72) Inventors: Enxing Hou, Beijing (CN); Hong Chen, Beijing (CN); Ziguang Gao, Beijing (CN)

(73) Assignee: XIAOMI INC., Beijing (CN)

(*) Notice: Subject to any disclaimer, the term of this patent is extended or adjusted under 35 U.S.C. 154(b) by 305 days.

(21) Appl. No.: 15/257,395

(22) Filed: Sep. 6, 2016

(65) Prior Publication Data

US 2017/0142230 A1 May 18, 2017

(30) Foreign Application Priority Data

Nov. 17, 2015 (CN) .......................... 2015 1 0792114

(51) Int. Cl.

| | |
|---|---|
| ***G06F 15/173*** | (2006.01) |
| ***H04L 29/08*** | (2006.01) |
| ***H04L 12/28*** | (2006.01) |
| ***H04L 29/06*** | (2006.01) |
| ***H04L 29/14*** | (2006.01) |

(52) U.S. Cl.

CPC .......... *H04L 67/125* (2013.01); *G06F 15/173* (2013.01); *H04L 12/282* (2013.01); *H04L 12/2814* (2013.01); *H04L 67/42* (2013.01); *H04L 69/30* (2013.01); *H04L 69/40* (2013.01)

(58) Field of Classification Search

CPC ............................ H04L 67/125; G06F 15/173

See application file for complete search history.

(56) References Cited

U.S. PATENT DOCUMENTS

2010/0289643 A1 11/2010 Trundle et al.
2012/0166642 A1* 6/2012 Saint Clair ........... H01L 67/125 709/225
2013/0082827 A1 4/2013 Cho
(Continued)

FOREIGN PATENT DOCUMENTS

CN 102354194 A 2/2012
CN 202475468 U 10/2012
CN 103699073 A 4/2014
(Continued)

OTHER PUBLICATIONS

First Office Action issued (including English translation) in corresponding Chinese Application No. 201510792114.9 dated Sep. 20, 2017, 19 pages.
(Continued)

*Primary Examiner* — Kyung H Shin
(74) *Attorney, Agent, or Firm* — Arch & Lake LLP

(57) ABSTRACT

Methods and apparatuses are provided for controlling smart device in a smart home. In the method, a control device receives a control instruction sent by an instruction sending device and including a set of working mode information, the set of working mode information including at least one working mode information of at least one smart device type. The control device sets a working mode of a target smart device connected to the control device via a local area network (LAN) based on the set of working mode information, where the set of working mode information is pre-stored in the instruction sending device.

11 Claims, 9 Drawing Sheets

(56) References Cited

U.S. PATENT DOCUMENTS

| | | | |
|---|---|---|---|
| 2013/0211614 A1 | 8/2013 | Choi | |
| 2014/0020033 A1 | 1/2014 | Wilson et al. | |

FOREIGN PATENT DOCUMENTS

| | | | |
|---|---|---|---|
| CN | 103941607 | A | 7/2014 |
| CN | 103959737 | A | 7/2014 |
| CN | 103970103 | A | 8/2014 |
| CN | 104007727 | A | 8/2014 |
| CN | 104469981 | A | 3/2015 |
| CN | 104483841 | A | 4/2015 |
| CN | 104580464 | A | 4/2015 |
| CN | 104808496 | A | 7/2015 |
| CN | 104836928 | A | 8/2015 |
| CN | 104879888 | A | 9/2015 |
| CN | 104880957 | A | 9/2015 |
| CN | 104881013 | A | 9/2015 |
| CN | 104885406 | A | 9/2015 |
| CN | 104915225 | A | 9/2015 |
| CN | 104977904 | A | 10/2015 |
| CN | 105005202 | A | 10/2015 |
| CN | 204695047 | U | 10/2015 |
| CN | 105487389 | A | 4/2016 |
| EP | 2938022 | A1 | 10/2015 |
| JP | 2004171277 | A | 6/2004 |
| JP | 2007304787 | A | 11/2007 |
| JP | 2012124567 | A | 6/2012 |
| JP | 2014195196 | A | 10/2014 |
| JP | 2015060555 | A | 3/2015 |
| RU | 130098 | U1 | 7/2013 |
| RU | 2520318 | C2 | 6/2014 |
| WO | 2013/048154 | A2 | 4/2013 |
| WO | 2016078135 | A1 | 5/2016 |

OTHER PUBLICATIONS

First Office Action issued (including English translation in corresponding Japanese Application No. 2016-550846 dated Dec. 19, 2017, 7 pages.

International Search Report issued in corresponding PCT Application No. PCT/CN2016/082693, dated Aug. 16, 2016, 20 pages.

Extended European Search Report issued in corresponding EP Application No. EP 16 19 0312, dated Mar. 2, 2017, 10 pages.

Second Office Action (including English translation) issued in corresponding Chinese Application No. 201510792114.9 dated Jun. 14, 2018, 23 pages.

English translation of International Preliminary Report on Patentability issued in corresponding International Application No. PCT/CN2016/082693, dated May 22, 2018, 1 pages.

Written Opinion (including English translation) issued in corresponding International Application No. PCT/CN2016/082693, dated Aug. 16, 2016, 13 pages.

First Office Action issued in corresponding Russian Application No. 2016134422/08(053651) dated Apr. 18, 2018, 10 pages.

* cited by examiner

SMART DEVICE CONTROL METHOD AND APPARATUS

CROSS-REFERENCE TO RELATED APPLICATION

This application is based on and claims priority of the Chinese Patent Application No. 201510792114.9, filed on Nov. 17, 2015, which is incorporated herein by reference in its entirety.

TECHNICAL FIELD

The present disclosure is related to the field of smart homes, and more particularly, to a smart device control method and apparatus.

BACKGROUND

With continuous development of smart home technologies, it has become a fundamental function of a smart home device for its user to set its working mode in a customized manner.

In the related arts, when a user wants to set the working mode of a smart device in a customized manner, he/she may perform the setting via a remote controller or an operation panel of the smart device. When the user enters a new environment or when the original working mode of the smart device was modified by others and the user wants to revert to the original working mode, the user needs to manually set the working mode of the smart device.

SUMMARY

According to a first aspect of the present disclosure, there is provided a smart device control method. In the method, a control device receives a control instruction sent by an instruction sending device and including a set of working mode information, each working mode information corresponding to a smart device type, the set of working mode information including at least one working mode information of at least one smart device type and being pre-stored in the instruction sending device. The control device sets a working mode of a target smart device connected to the control device via a local area network (LAN), based on the set of working mode information.

According to a second aspect of the present disclosure, there is provided a smart device control method. In the method, an instruction sending device receives an instruction of setting a working mode of a target smart device. The instruction sending device sends a control instruction including a set of working mode information to a control device, each working mode information corresponding to a smart device type, the set of working mode information including at least one working mode information of at least one smart device type, where the control device sets a working mode of the target smart device connected to the control device via a local area network (LAN), based on the set of working mode information.

According to a third aspect of the present disclosure, there is provided a smart device control apparatus, which may be implemented in a control device. The smart device control apparatus includes: a first instruction receiving module and a control module. The first instruction receiving module is configured to receive a control instruction sent by an instruction sending device and including a set of working mode information, each working mode information corresponding to a smart device type, the set of working mode information including at least one working mode information of at least one smart device type and being pre-stored in the instruction sending device. The control module is configured to set a working mode of a target smart device connected to the control device via a local area network (LAN) based on the set of working mode information.

According to a fourth aspect of the present disclosure, there is provided a smart device control apparatus, which may be applied in an instruction sending device. The smart device control apparatus includes: a second instruction receiving module and an instruction sending module. The second instruction receiving module is configured to receive an instruction of setting a working mode of a target smart device. The instruction sending module is configured to send a control instruction including a set of working mode information to a control device, each working mode information corresponding to a smart device type, the set of working mode information including at least one working mode information of at least one smart device type, where the control device sets a working mode of the target smart device connected to the control device via a local area network (LAN) based on the set of working mode information.

According to a fifth aspect of the present disclosure, there is provided a smart device control apparatus, which may be implemented in a control device. The smart device control apparatus includes: a processor and a memory storing instructions executable by the processor. The processor is configured to: receive a control instruction sent by an instruction sending device and including a set of working mode information, each working mode information corresponding to a smart device type, the set of working mode information including at least one working mode information of at least one smart device type and being pre-stored in the instruction sending device; and set a working mode of a target smart device connected to the control device via a local area network (LAN), based on the set of working mode information.

According to a sixth aspect of the present disclosure, there is provided a smart device control apparatus, which may be applied in an instruction sending device. The smart device control apparatus includes: a processor and a memory storing instructions executable by the processor. The processor is configured to: receive an instruction of setting a working mode of a target smart device; and send a control instruction including a set of working mode information to a control device, each working mode information corresponding to a smart device type, the set of working mode information including at least one working mode information of at least one smart device type, where the control device sets a working mode of the target smart device connected to the control device via a local area network (LAN) based on the set of working mode information.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Reference will now be made in detail to embodiments, examples of which are illustrated in the accompanying drawings. The following description refers to the accompanying drawings in which the same numbers in different drawings represent the same or similar elements unless otherwise presented. The embodiments set forth in the following description of embodiments do not represent all embodiments consistent with the disclosure. Instead, they are merely examples of apparatuses and methods consistent with aspects related to the disclosure as recited in the appended claims.

Figure 1:
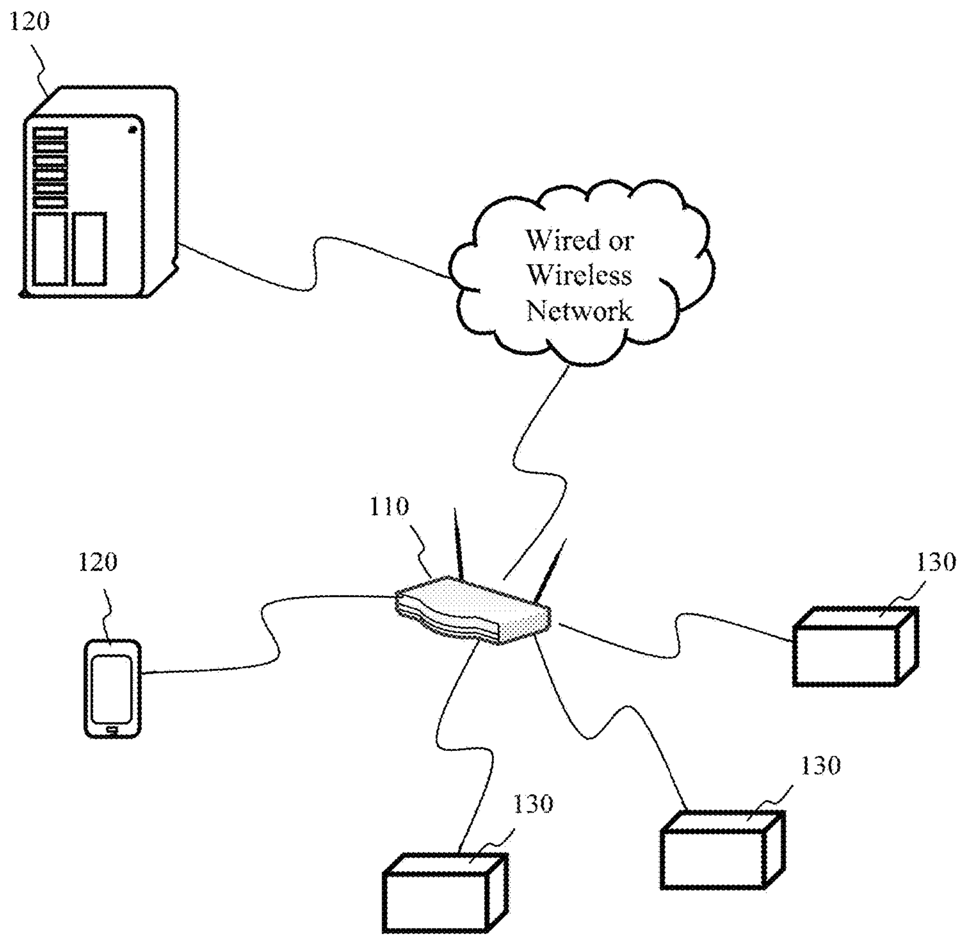
FIG. 1 is a schematic drawing showing an application environment for implementing embodiments of this disclosure.

FIG. 1 is a schematic drawing showing an application environment for implementing the one or more embodiments of this disclosure. As shown in FIG. 1, the application environment may include a control device 110, an instruction sending device 120 and at least one smart device 130.

The control device 110 is connected to the instruction sending device 120 and the at least one smart device 130 respectively. The control device 110 may be a router, a home gateway, a home control center, or the like.

The instruction sending device 120 may be a terminal device, such as a smart handset, a tablet computer, an electronic book reader or the like. Alternatively, the instruction sending device 120 may be implemented as a network server which can receive data or instructions sent by user terminals.

The smart device 130 may be a smart household device having computing and processing functions, such as a smart TV, an air conditioner, a TV set-top box, a smart camera, a smart electric lamp, a smart socket, an air purifier, a water purifier or the like.

Figure 2:
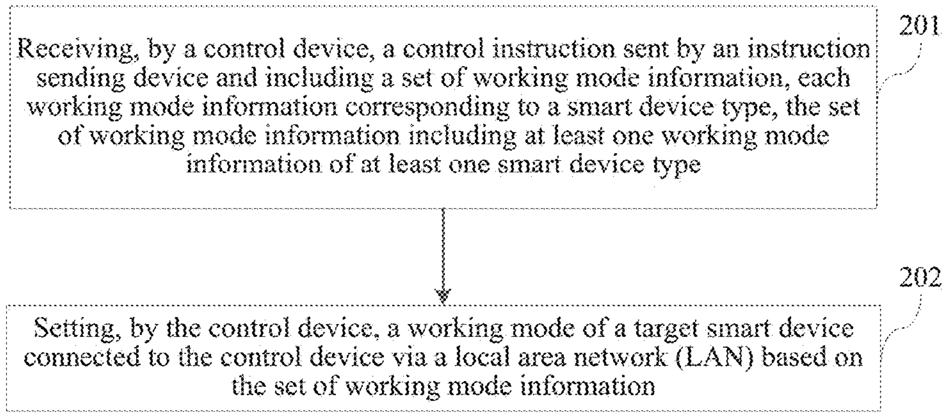
FIG. 2 is a flow chart showing a smart device control method according to an embodiment.

FIG. 2 is a flow chart showing a smart device control method for controlling smart devices according to an embodiment. This embodiment is exemplified by applying the smart device control method to the control device 110 in the application environment shown in FIG. 1. The smart device control method may include the following steps.

In step S201, the control device receives a control instruction sent by an instruction sending device and including a set of working mode information, each working mode information corresponding to a smart device type, the set of working mode information including at least one working mode information of at least one smart device type and being pre-stored in the instruction sending device.

In step S202, the control device sets a working mode of a target smart device connected to the control device via a local area network (LAN), based on the set of working mode information.

To sum up, in the smart device control method according to the embodiment of the disclosure, a control device receives a control instruction sent by an instruction sending device and including a set of working mode information, the set of working mode information including at least one working mode information of at least one smart device type; and the control device sets a working mode of a target smart device connected to the control device via a local area network (LAN) based on the set of working mode information, where the set of working mode information is pre-stored in the instruction sending device. As such, when a user intends to set a working mode of a smart device, the control device can automatically complete the setting of the working mode as long as a related control instruction is sent to the control device by the instruction sending device, thereby simplifying the setting operations of the user and enhancing the user experience.

Figure 3:
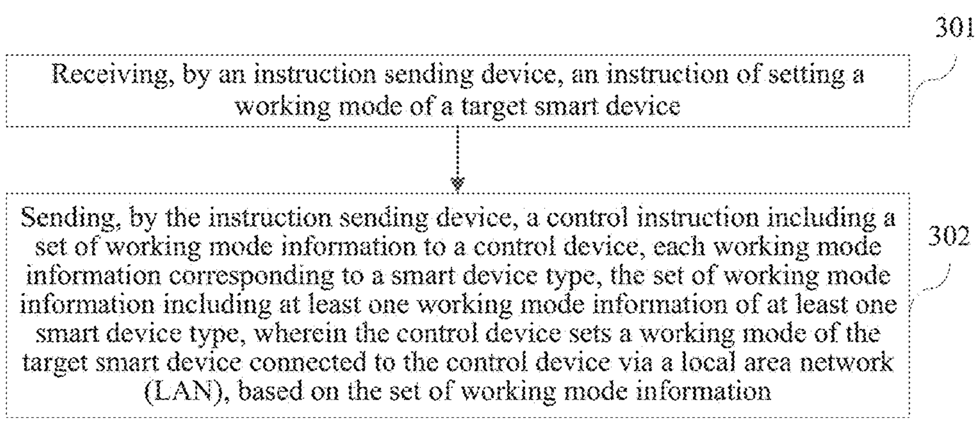
FIG. 3 is a flow chart showing a smart device control method according to another embodiment.

FIG. 3 is a flow chart showing a smart device control method according to another embodiment. This embodiment is exemplified by applying the smart device control method to the instruction sending device 120 in the application environment shown in FIG. 1. The smart device control method may include the following steps.

In step S301, the instruction sending device receives an instruction of setting a working mode of a target smart device.

In step S302, the instruction sending device sends a control instruction including a set of working mode information to a control device, each working mode information corresponding to a smart device type, the set of working mode information including at least one working mode information of at least one smart device type, where the control device sets a working mode of the target smart device connected to the control device via a local area network (LAN) based on the set of working mode information.

To sum up, in the smart device control method according to the embodiment of the disclosure, an instruction sending device sends to a control device a control instruction including a set of working mode information, the set of working mode information including at least one working mode information of at least one smart device type; and the control device sets a working mode of a target smart device connected to the control device via a local area network (LAN) based on the set of working mode information, where the set of working mode information is pre-stored in the instruction sending device. As such, when a user intends to set a working mode of a smart device, the control device can automatically complete the setting of the working mode as long as a related control instruction is sent to the control device by the instruction sending device, thereby simplifying the setting operations of the user and enhancing the user experience.

Figure 4A:
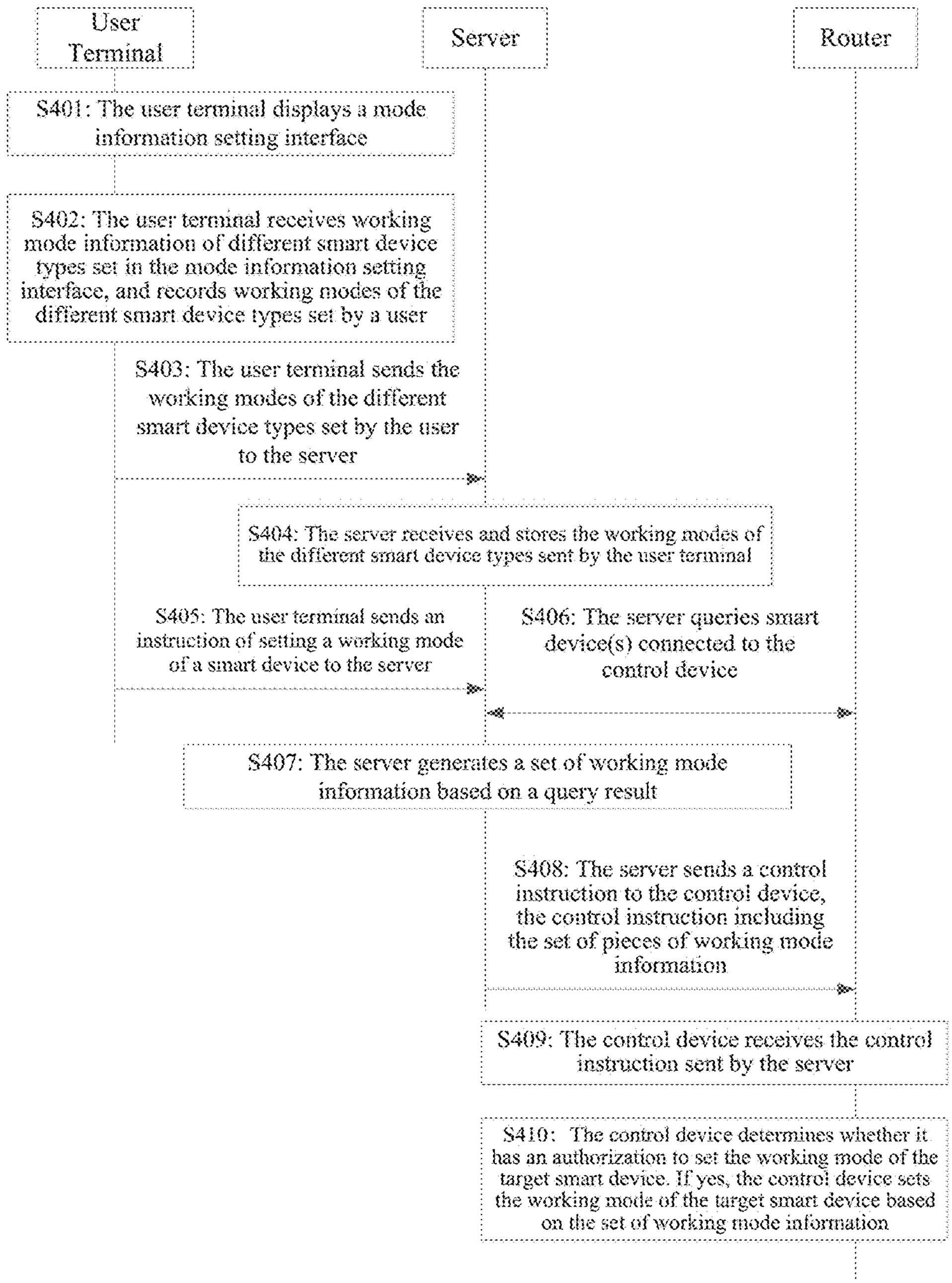
FIG. 4A is a flow chart showing a smart device control method according to yet another embodiment.

FIG. 4A is a flow chart showing a smart device control method according to yet another embodiment. This embodiment is exemplified by applying the smart device control method to the application environment shown in FIG. 1 and by implementing the instruction sending device 120 as a server. The smart device control method may include the following steps.

In step S401, a user terminal displays a mode information setting interface.

Figure 4B:
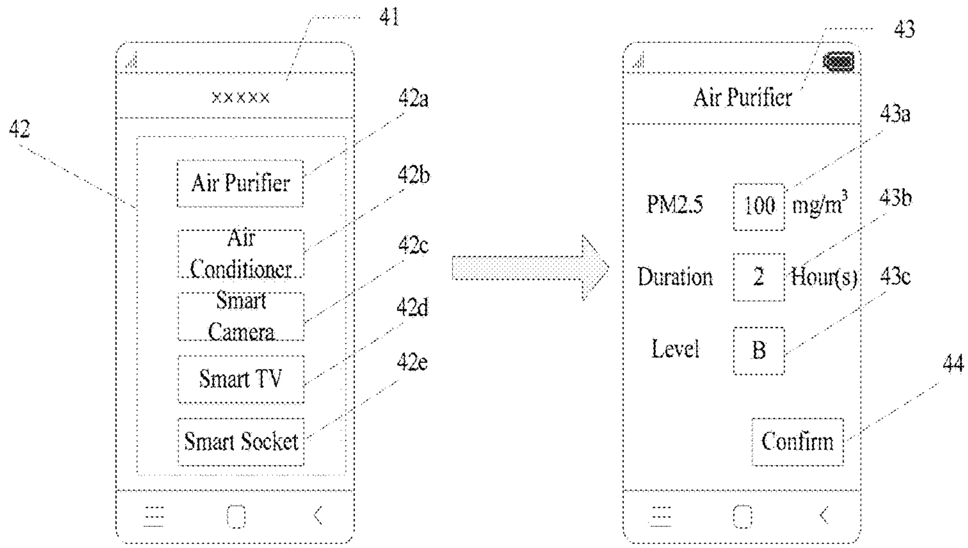
FIG. 4B is a schematic drawing showing an information setting process according to an embodiment.

A user may set working mode information of various types of smart devices in the user terminal in advance. For example, FIG. 4B is a schematic drawing showing an information setting process. As shown, after the user terminal has a designated application installed therein, the user may start this application to display a main interface for mode information setting 41, which includes options 42 of various smart device types, such as an air purifier, a smart TV, an air conditioner, a TV set-top box, a smart camera, a smart electric lamp, a smart socket, a water purifier or the like. By clicking an option 42*a*, the user can enter a mode information setting interface 43 for air purifiers.

In step S402, the user terminal receives working mode information of different smart device types set in the mode information setting interface, and records working modes of the different smart device types set by a user.

As shown in FIG. 4B, the user may set related mode information in the mode information setting interface 43. For example, in the mode information setting interface 43 for air purifiers, the user may set a PM 2.5 threshold in the setting area 43*a*, a purification duration in the setting area 43*b* and a purification level in the setting area 43*c*. After the settings are made, the user may click a Confirm key 44 to save the set working mode information and record the working mode of air purifiers. For example, after the settings are made as shown in FIG. 4B, the user terminal records the working mode of air purifiers as below: when the PM 2.5 concentration exceeds 100 mg/m$^3$, an air purification function is started for a purification duration of 2 hours at a purification level of Level B. Similarly, the user may enter the mode information setting interface for smart TVs by clicking an option 42*b* in the mode information setting main interface 41, and set the working mode information for the device type of smart TV; the user may enter the mode information setting interface for air conditioners by clicking an option 42*c* in the mode information setting main interface 41, and set the working mode information for the device type of air conditioner; and so on.

In step S403, the user terminal sends the working modes of the different smart device types set by the user to the server.

In step S404, the server receives and stores the working modes of the different smart device types sent by the user terminal.

After the user completes the setting in the working mode information setting interfaces corresponding to different smart device types and confirms the same, the user terminal uploads the working modes of different smart device types set by the user to the server, and the server records the working modes.

In step S405, the user terminal sends an instruction of setting a working mode of a smart device to the server.

When the user terminal accesses a control device or the user selects a control device in a specific application of the user terminal, the user may click a key labeled "Set the working mode by one key" in a main interface of the specific application. In this case, the user terminal may have an identification of the control device, such as its media access control (MAC) address, carried in the instruction of setting the working mode of the smart device, and send the instruction to the server.

In step S406, the server queries smart device(s) connected to the control device.

For example, the server may send a device query request to the control device. After receiving the query request, the control device sends the identifications of the smart devices connected to it to the server.

In step S407, the server generates a set of working mode information based on a query result.

The server may determine types of the smart devices connected to the control device based on the received identifications of the smart devices, and combine working mode information corresponding to the types of the smart devices connected to the control device into the set of working mode information.

For example, after querying the smart devices connected to the control device, the server may generate a set of working mode information based on the types of the smart devices connected to the control device, and combine the working mode information corresponding to the smart device types set in steps S401 and S402 with the working mode information corresponding to the types of the smart devices connected to the control device into a set of working mode information. For example, the control device is connected with three smart devices including an air purifier, an air conditioner and a smart camera. In steps S401 and S402, the user sets the working mode information for three smart device types, including an air purifier type, an air conditioner type and a smart TV type. In this case, the server combines the working mode information corresponding to the air purifier type and the air conditioner type into a set of working mode information.

In step S408, the server sends a control instruction to the control device, where the control instruction includes the set of working mode information.

In step S409, the control device receives the control instruction sent by the server.

In step S410, the control device determines whether it has an authorization to set the working mode of the target smart device. When determining that the control device has the authorization, the control device sets the working mode of the target smart device based on the set of working mode information.

The target smart device is a smart device connected to the control device via a LAN.

In one or more embodiments of this disclosure, the owner of the smart device may set whether the smart device supports "set working mode by one key". If the owner of the smart device sets that the smart device does not support "set working mode by one key," the control device does not have the authorization to set the working mode of the target smart device. Therefore, after receiving the control instruction sent by the server, the control device first determines whether it has the authorization to set the working mode of the target smart device. If the control device has the authorization to set the working mode of the target smart device, the control device may send the working mode information corresponding to the target smart device to the target smart device, and the target smart device will automatically set its own working mode based on the corresponding working mode information.

Optionally, the step in which the control device determines whether it has the authorization to set the working mode of the target smart device may be performed in step S406. That is, when the server queries the smart devices connected to the control device, the control device may detect for which device(s) among the smart devices connected to thereto it has an authorization to set working mode(s), and only return to the server identification(s) of the device(s) for which it has the authorization to set the working mode(s).

In the above embodiment, the owner of the smart device may set if the smart device supports "set working mode by one key." If the owner of the smart device sets that the smart device does not support "set working mode by one key," nobody can set the working mode of the smart device by one key. Optionally, the owner of the smart device may set that the smart device supports "set working mode by one key" for some users including the owner himself/herself. For example, the owner of the smart device may share his/her authorization to "set the working mode of the smart device by one key" with his/her friends. Then, the owner of the smart device and his/her friends who share the authorization can set the working mode of the smart device by one key. In practical application, the control instruction sent by the server may also carry an identification of the user terminal. Only when the control device determines that the user of the user terminal corresponding to the identification of the user terminal has the authorization to "set the working mode of the smart device by one key," will the control device set the working mode of the target smart device based on the set of working mode information. Otherwise, the control device will not set the working mode of the target smart device. Optionally, the determination process may also be performed by the server. That is, only when the server determines that the user of the user terminal corresponding to the identification of the user terminal has the authorization to "set the working mode of the target smart device connected to the control device by one key," will the server send the control instruction to the control device.

For example, the control device is a router and the user terminal is a smart handset. In a possible application scene, after installing an application for controlling a smart household device in the smart handset, the user opens a working mode setting interface for smart devices, and presets therein the working mode information of three smart device types including an air purifier type, an air conditioner type and a smart TV type. The smart handset sends the working mode information of the three smart device types to the server. The server records and stores the working mode information. After the smart handset accesses the router, the user may send to the server a request of "setting working mode by one key" using the application, the request including an MAC address of the router. After receiving the request, the server sends a query instruction to the router. The router receives the query instruction and sends the identifications of the smart devices connected to the router to the server. The smart devices connected to the router include an air purifier A, an air conditioner B and a smart camera C. The server determines based on the stored working mode information of the different smart device types working mode information available to the air purifier A and the air conditioner B, combines the working mode information of the air purifier and the air conditioner set by the user into a set of working mode information, and sends a control instruction including the set of working mode information to the router. After receiving the control instruction and determining that it has the authorization to set the working modes of the air purifier A and the air conditioner B, the router sends the working mode information corresponding to the types of the air purifier A and the air conditioner B to corresponding devices. Then, the air purifier A and the air conditioner B automatically perform setting of their working modes.

To sum up, in the smart device control method according to the embodiment of the disclosure, a user presets in a user terminal working mode information of different smart device types, and the working mode information is stored in a server; when the user terminal accesses a control device, the user terminal sends to the server an instruction of setting working mode by one key; the server generates a set of working mode information based on the types of the smart devices connected to the control device, and the server sends the set of working mode information to the control device; and the control device automatically sets the working mode of the smart devices connected to the control device. As such, setting operations of the user can be simplified and the user experience can be enhanced.

Figure 5A:
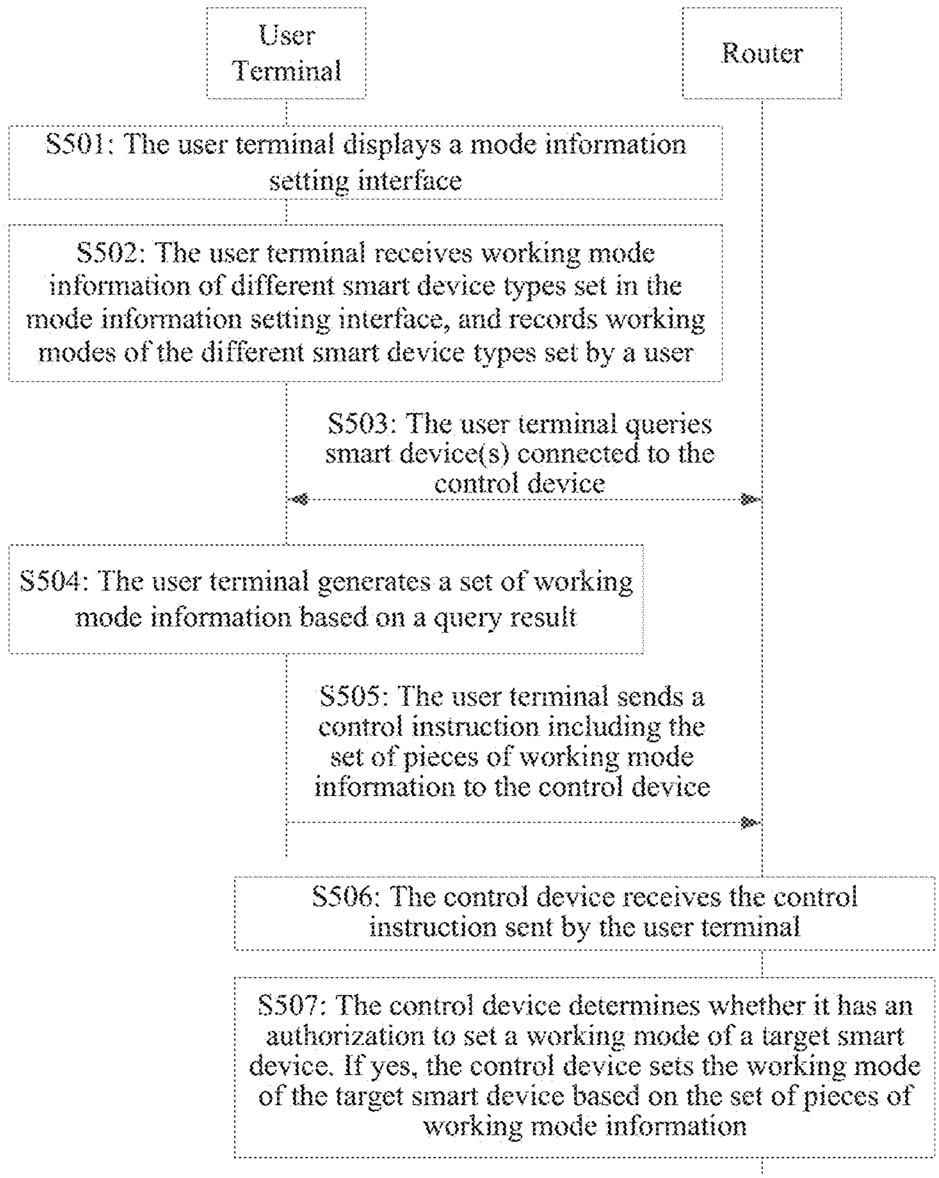
FIG. 5A is a flow chart showing a smart device control method according to yet another embodiment.

FIG. 5A is a flow chart showing a smart device control method for controlling smart devices according to yet another embodiment. This embodiment is exemplified by applying the smart device control method to the application environment shown in FIG. 1 and by implementing the instruction sending device 120 as a user terminal. The smart device control method may include the following steps.

In step S501, the user terminal displays a mode information setting interface.

In step S502, the user terminal receives working mode information of different smart device types set in the mode information setting interface, and records working modes of the different smart device types set by a user.

Regarding the process for a user to set the working modes of different types of smart devices, reference can be made to descriptions for steps S401-S402 in the embodiment shown in FIG. 4A, and the description of the process will not be repeated herein.

When receiving an instruction of setting a working mode of a target smart device connected to a control device, the user terminal may send to the control device the set working mode information corresponding to different types of smart devices connected to the control device, and then the control device sets the working mode of the target smart device. This process will be described in steps S503-S507.

In step S503, the user terminal queries smart device(s) connected to the control device.

After the user clicks the key labeled "set working mode by one key" on the user terminal, the user terminal can directly query the smart devices connected to the control device. The instruction sent as a result of clicking the key labeled "set working mode by one key" by the user is the above "instruction of setting the working mode of the target smart device connected to the control device".

For example, when the user terminal accesses the control device through short range radio communications, the user terminal may broadcast radio signals requesting its surrounding smart devices to return information such as identifications of control devices they access or requesting some of its surrounding smart devices which access the same control device as the user terminal to return responses. The user terminal determines which smart devices are connected to the control device based on the information or response returned by these surrounding smart devices.

Alternatively, the user terminal may query the control device. For example, the user terminal may send a query request to the control device. The control device sends the identifications of the smart devices connected thereto to the user terminal.

Alternatively, the user terminal may remotely access the control device through a server. In this case, the user terminal may send a query request to the control device. The control device sends information, such as the identifications of the smart devices accessing the control device, to the user terminal based on the query request.

In step S504, the user terminal generates a set of working mode information based on a query result.

Regarding a possible implementation for the user terminal generates a set of working mode information, reference can be made to the process for a server to generate a set of working mode information described in the embodiment of FIG. 4A (i.e., descriptions of step S407 in the embodiment of FIG. 4A), and the description thereof will not be repeated herein.

In another possible implementation, the user terminal may display a device selecting interface to the user, the device selecting interface including identifications of the smart devices connected to the control device. The user may select one or more of the smart devices as one or more target smart devices, in such a manner that working mode information has been set for device types of the selected smart devices. Optionally, among the identifications of the smart devices which are displayed in the device selecting interface, the identifications of the smart devices for which working mode information has been set are displayed in a selectable state, while the identifications of the smart devices for which the working mode information has not been set are displayed in a non-selectable state. In the device selecting interface, each of the identifications of the smart devices for which the working mode information has not been set is further provided with a working mode information setting entry. When an operation on the working mode information setting entry is detected, the user terminal may enter a working mode setting interface for a smart device corresponding to the working mode information setting entry.

Figure 5B:
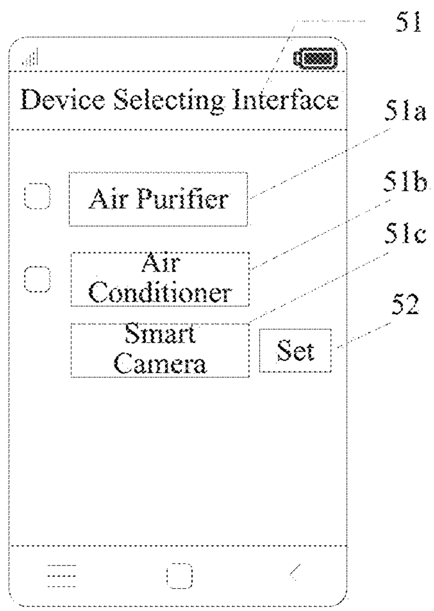
FIG. 5B is a schematic drawing showing a device selecting interface according to an embodiment.

For example, FIG. 5B is a schematic drawing showing a device selecting interface. As shown in FIG. 5B, after receiving the identifications of the smart devices connected to the control device, which are sent by the control device, the user terminal displays to the user a device selecting interface 51, which includes the identifications of the smart devices connected to the control device. As shown in FIG. 5B, there are three smart devices connected to the control device, which are displayed in the device selecting interface 51 as an air purifier 51*a*, an air conditioner 51*b* and a smart camera 51*c*. The user has set the working mode information for the air purifier device type and the air conditioner device type, so the air purifier 51*a* and the air conditioner 51*b* are in a selectable state, while the smart camera 51*c* is in a non-selectable state. After the user clicks the air purifier 51*a* and the air conditioner 51*b*, the user terminal combines the working mode information for the device types corresponding to the air purifier 51*a* and the air conditioner 51*b* into one set of working mode information. In addition, a "set" key 52 is provided for the smart camera 51*c*. After the user clicks the "set" key 52, the user terminal displays a mode information setting interface for smart cameras (for which reference can be made to the mode information setting interface 43 for air purifiers shown in FIG. 4B). In the mode information setting interface for smart cameras, the working mode information for smart cameras can be set. After the user sets the working mode information for smart cameras and returns to the device selecting interface 51, the smart camera 51*c* is shown to be in a selectable state.

In S505, the user terminal sends a control instruction including the set of working mode information to the control device.

In S506, the control device receives the control instruction sent by the user terminal.

The control device may receive the control instruction from the user terminal directly or via a server.

In S507, the control device determines whether it has an authorization to set a working mode of a target smart device. If yes, the control device sets the working mode of the target smart device based on the set of working mode information.

The target smart device is a smart device connected to the control device via a LAN.

For example, the control device is a router and the user terminal is a smart handset. In a possible application scene, after installing an application for controlling a smart household device in the smart handset, the user opens a working mode setting interface for smart devices, and presets therein the working mode information of three smart device types including an air purifier type, an air conditioner type and a smart TV type. After the smart handset accesses the router, the user may click a key labeled "set the working mode by one key" in the application. Then, the smart handset queries smart devices connected to the router, the smart devices connected to the router including an air purifier A, an air conditioner B and a smart camera C. The smart handset based on the working mode information of the different smart device types preset by the user determines the working mode information available to the air purifier A and the air conditioner B, combines the working mode information of the air purifier A and the air conditioner B set by the user into a set of working mode information, and sends a control instruction including the set of working mode information to the router. After receiving the control instruction and determining that it has the authorization to set the working modes of the air purifier A and the air conditioner B, the router sends the working mode information corresponding to the types of the air purifier A and the air conditioner B to corresponding devices. Then, the air purifier A and the air conditioner B automatically perform setting of their working modes. Optionally, after the smart handset queries the smart devices connected to the router, identifications of the smart devices connected to the router may be displayed in a device selecting interface, in which the user may select one or both of the air purifier A and the air conditioner B to combine the working mode information thereof or in which the user may enter a mode information setting interface for the smart camera C and set the working mode information of the smart camera C.

To sum up, in the smart device control method according to the embodiment of the disclosure, a user presets in a user terminal working mode information of different smart device types; when the user terminal accesses a control device, the user terminal queries smart devices connected to the control device; the user terminal generates a set of working mode information based on the types of the smart devices connected to the control device, and sends the set of working mode information to the control device; and the control device automatically sets the working modes of the smart devices connected to the control device. As such, setting operations of the user can be simplified and the user experience can be enhanced.

The followings describe the apparatus embodiments of the present disclosure, which may be used to perform the method embodiments of the present disclosure. For the details not disclosed in the apparatus embodiments of the present disclosure, please refer to the method embodiments of the present disclosure.

Figure 6:
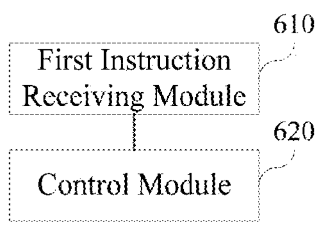
FIG. 6 is a block view showing a smart device control apparatus according to an embodiment.

FIG. 6 is a block view showing a smart device control apparatus according to an embodiment. This embodiment is exemplified by applying the smart device control apparatus to the control device 110 in the application environment shown in FIG. 1. The smart device control apparatus may include a first instruction receiving module 610 and a control module 620.

The first instruction receiving module 610 is configured to receive a control instruction sent by an instruction sending device and including a set of working mode information, each working mode information corresponding to a smart device type, the set of working mode information including at least one working mode information of at least one smart device type and being pre-stored in the instruction sending device.

The control module 620 is configured to set a working mode of a target smart device connected to the control device via a local area network (LAN) based on the set of working mode information.

To sum up, in the smart device control apparatus according to the embodiment of the disclosure, a control device receives a control instruction sent by an instruction sending device and including a set of working mode information, the set of working mode information including at least one working mode information of at least one smart device type; and the control device sets a working mode of a target smart device connected to the control device via a local area network (LAN) based on the set of working mode information, where the set of working mode information is pre-stored in the instruction sending device. As such, when a user intends to set a working mode of a smart device, the control device can automatically complete the setting of the working mode as long as a related control instruction is sent to the control device by the instruction sending device, thereby simplifying the setting operations of the user and enhancing the user experience.

Figure 7:
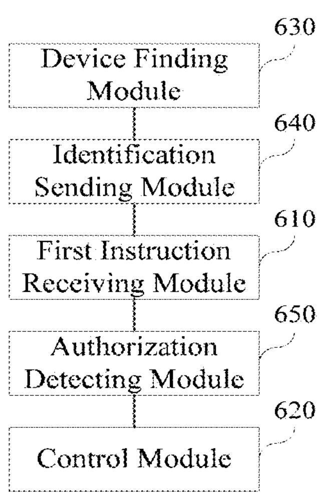
FIG. 7 is a block view showing a smart device control apparatus according to another embodiment.

FIG. 7 is a block view showing a smart device control apparatus according to another embodiment. This embodiment is exemplified by applying the smart device control apparatus to the control device 110 in the application environment shown in FIG. 1. The smart device control apparatus may include a first instruction receiving module 610 and a control module 620.

The first instruction receiving module 610 is configured to receive a control instruction sent by an instruction sending device and including a set of working mode information, each working mode information corresponding to a smart device type, the set of working mode information including at least one working mode information of at least one smart device type and being pre-stored in the instruction sending device. Here, the first instruction receiving module 610 may be implemented at least partially using a receiver circuitry.

The control module 620 is configured to set a working mode of a target smart device connected to the control device via a local area network (LAN) based on the set of working mode information. The control module 620 may be implemented at least partially using a controller circuitry.

Optionally, the apparatus further includes: a device querying module 630 and an identification sending module 640. The one or more modules 610, 620, 630, and 640 may be implemented using one or more circuitry.

The device querying module 630 is configured to query one or more smart devices connected to the control device, before the first instruction receiving module 610 receives the control instruction sent by the instruction sending device. The control device may determine how many smart devices are connected to the control device before receiving the control instruction.

The identification sending module 640 is configured to send identifications of the one or more smart devices connected to the control device to the instruction sending device. The control device may identify all connected smart devices using the received identifications sent from the identification sending module 640.

Optionally, the apparatus further includes an authorization detecting module 650.

The authorization detecting module 650 is configured to determine whether the control device has an authorization to set the working mode of the target smart device before the control module 620 sets the working mode of the target smart device based on the set of working mode information.

The control module 620 is configured to set the working mode of the target smart device based on the set of working mode information, when the authorization detecting module 650 determines that the control device has the authorization to set the working mode of the target smart device.

For example, the control device may be a router, and the instruction sending device may be a server or a user terminal.

To sum up, in the smart device control apparatus according to the embodiment of the disclosure, a control device receives a control instruction sent by an instruction sending device and including a set of working mode information, the set of working mode information including at least one working mode information of at least one smart device type; and the control device sets a working mode of a target smart device connected to the control device via a local area network (LAN) based on the set of working mode information, where the set of working mode information is pre-stored in the instruction sending device. As such, when a user intends to set a working mode of a smart device, the control device can automatically complete the setting of the working mode as long as a related control instruction is sent to the control device by the instruction sending device, thereby simplifying the setting operations of the user and enhancing the user experience.

Figure 8:
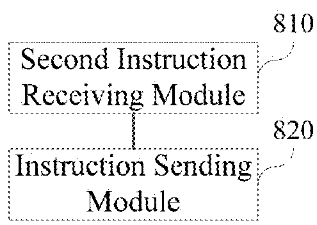
FIG. 8 is a block view showing a smart device control apparatus according to yet another embodiment.

FIG. 8 is a block view showing a smart device control apparatus according to yet another embodiment. This embodiment is exemplified by applying the smart device control apparatus to the instruction sending device 120 in the application environment shown in FIG. 1. The smart device control apparatus may include a second instruction receiving module 810 and an instruction sending module 820.

The second instruction receiving module 810 is configured to receive an instruction of setting a working mode of a target smart device.

The instruction sending module 820 is configured to send a control instruction including a set of working mode information to a control device, each working mode information corresponding to a smart device type, the set of working mode information including at least one working mode information of at least one smart device type, where the control device sets a working mode of the target smart device connected to the control device via a local area network (LAN) based on the set of working mode information.

To sum up, in the smart device control apparatus according to the embodiment of the disclosure, an instruction sending device sends to a control device a control instruction including a set of working mode information, the set of working mode information including at least one working mode information of at least one smart device type; and the control device sets a working mode of a target smart device connected to the control device via a local area network (LAN) based on the set of working mode information, where the set of working mode information is pre-stored in the instruction sending device. As such, when a user intends to set a working mode of a smart device, the control device can automatically complete the setting of the working mode as long as a related control instruction is sent to the control device by the instruction sending device, thereby simplifying the setting operations of the user and enhancing the user experience.

Figure 9:
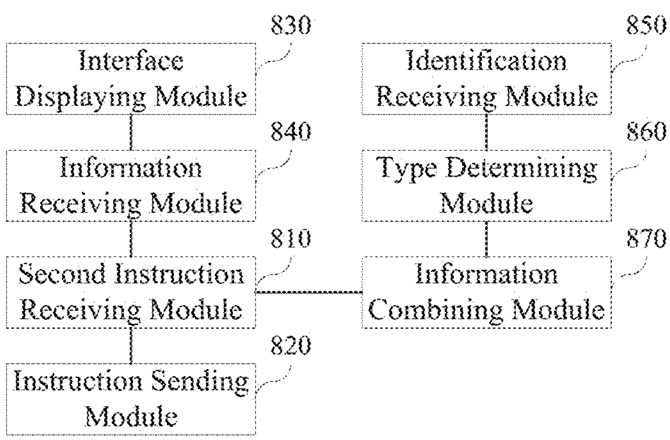
FIG. 9 is a block view showing a smart device control apparatus according to yet another embodiment.

FIG. 9 is a block view showing a smart device control apparatus according to yet another embodiment. This embodiment is exemplified by applying the smart device control apparatus to the instruction sending device 120 in the application environment shown in FIG. 1. The smart device control apparatus may include a second instruction receiving module 810 and an instruction sending module 820.

The second instruction receiving module 810 is configured to receive an instruction of setting a working mode of a target smart device.

The instruction sending module 820 is configured to send a control instruction including a set of working mode information to a control device, each working mode information corresponding to a smart device type, the set of working mode information including at least one working mode information of at least one smart device type, where the control device sets a working mode of the target smart device connected to the control device via a local area network (LAN) based on the set of working mode information.

Optionally, the apparatus further includes an interface displaying module 830 and an information receiving module 840.

The interface displaying module 830 is configured to display a mode information setting interface before the second instruction receiving module receives the instruction of setting the working mode of the target smart device.

The information receiving module 840 is configured to receive working mode information of different smart device types set in the mode information setting interface, and record working modes of the different smart device types set by a user.

Optionally, the apparatus further includes an identification receiving module 850, a type determining module 860 and an information combining module 870.

The identification receiving module 850 is configured to, before the instruction sending module sends the instruction including a working mode of the target smart device to the control device, receive identifications of one or more smart devices connected to the control device, the identifications being sent by the control device.

The type determining module 860 is configured to determine types of the smart devices connected to the control device based on the identifications of the smart devices received by the identification receiving module 850.

The information combining module 870 is configured to combine working mode information corresponding to the types of the smart devices connected to the control device into the set of working mode information.

To sum up, in the smart device control apparatus according to the embodiment of the disclosure, an instruction sending device sends to a control device a control instruction including a set of working mode information, the set of working mode information including at least one working mode information of at least one smart device type; and the control device sets a working mode of a target smart device connected to the control device via a local area network (LAN) based on the set of working mode information, where the set of working mode information is pre-stored in the instruction sending device. As such, when a user intends to set a working mode of a smart device, the control device can automatically complete the setting of the working mode as long as a related control instruction is sent to the control device by the instruction sending device, thereby simplifying the setting operations of the user and enhancing the user experience.

It should be noted that, when smart devices are controlled by the apparatuses provided by the above embodiments, the above division into various functional modules is just described by way of example. In practical application, the above functions may be performed by different functional modules, that is, the internal structure of these apparatuses may be divided into different functional modules to realize all or part of the above-described functions.

With respect to the apparatuses in the above embodiments, the specific manners for individual modules therein to perform operations have been described in detail in the embodiments of the related methods, and will not be elaborated herein.

Another embodiment of this disclosure also provides a smart device control apparatus, which can implement the smart device control method provided by this disclosure. The apparatus includes a processor and a memory storing instructions executable by the processor. The processor is configured to: receive a control instruction sent by an instruction sending device and including a set of working mode information, each working mode information corresponding to a smart device type, the set of working mode information including at least one working mode information of at least one smart device type and being pre-stored in the instruction sending device; and set a working mode of a target smart device connected to the control device via a local area network (LAN), based on the set of working mode information.

Optionally, the processor is further configured to: before receiving the control instruction sent by the instruction sending device, find one or more smart devices connected to the control device; and send identifications of the smart devices connected to the control device to the instruction sending device.

Optionally, the processor is further configured to: before setting the working mode of the target smart device based on the set of working mode information, determine whether the control device has an authorization to set the working mode of the target smart device; and if the control device has the authorization to set the working mode of the target smart device, set the working mode of the target smart device based on the set of working mode information.

Optionally, the control device is a router, and the instruction sending device is a server or a user terminal.

Another embodiment of this disclosure also provides a smart device control apparatus, which can realize the smart device control method provided by this disclosure. The apparatus includes a processor and a memory storing instructions executable by the processor. The processor is configured to: receive an instruction of setting a working mode of a target smart device; and send a control instruction including a set of working mode information to a control device, each working mode information corresponding to a smart device type, the set of working mode information including at least one working mode information of at least one smart device type, where the control device sets a working mode of the target smart device connected to the control device via a local area network (LAN), based on the set of working mode information.

Optionally, the processor is further configured to: before receiving the instruction of setting the working mode of the target smart device, cause a display screen to display a mode information setting interface; receive working mode information of different smart device types set in the mode information setting interface, and record working modes of the different smart device types set by a user.

Optionally, the processor is further configured to: receive identifications of one or more smart devices connected to the control device, the identifications being sent by the control device; determine types of the smart devices connected to the control device based on the received identifications of the smart devices; and combine the working mode information corresponding to the types of the smart devices connected to the control device into the set of working mode information.

Here, the control device may be a router, and the instruction sending device may be a server or a user terminal.

Figure 10:
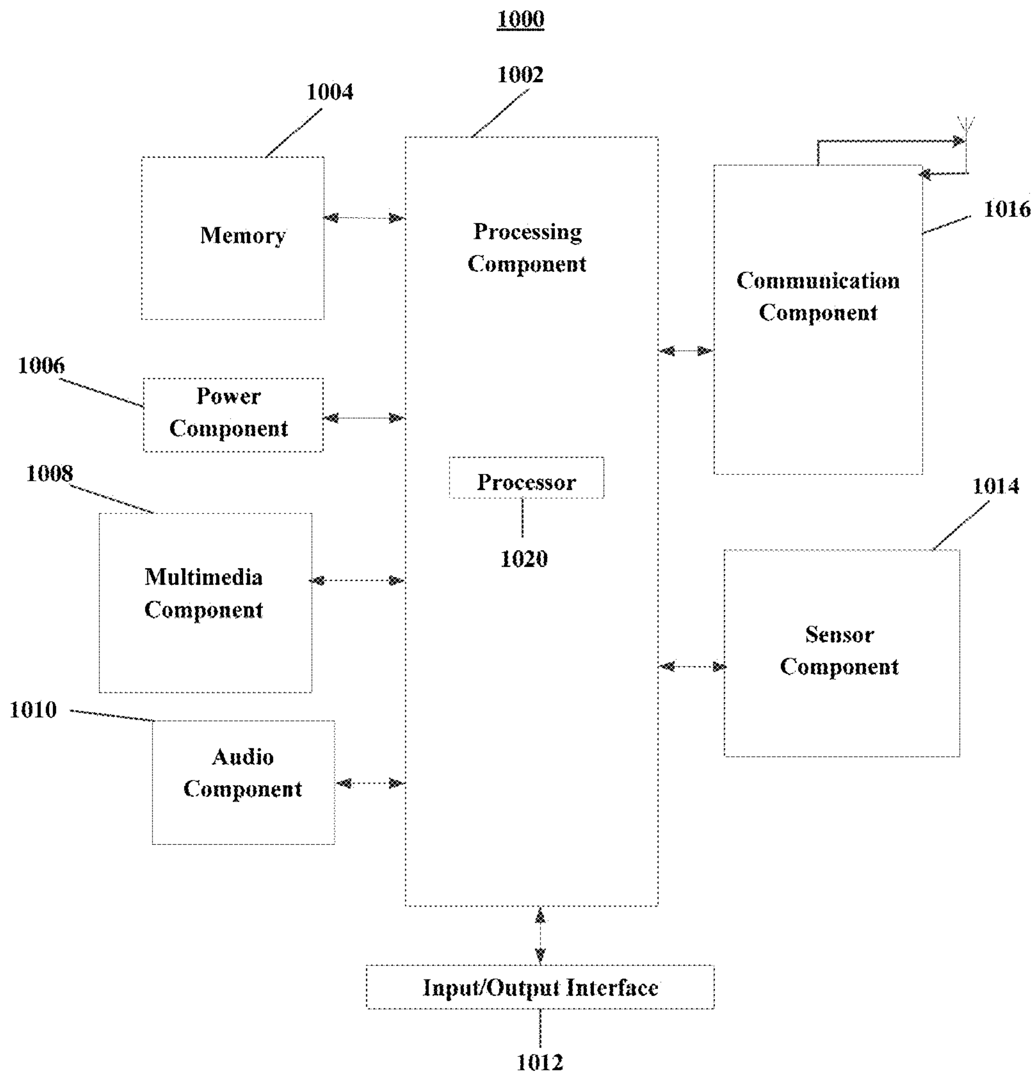
FIG. 10 is a block view showing a smart device control apparatus according to yet another embodiment.

FIG. 10 is a block view showing a smart device control apparatus 1000 according to still another embodiment. For example, the apparatus 1000 may be a mobile phone, a computer, a digital broadcast terminal, a messaging device, a gaming console, a tablet, a medical device, exercise equipment, a personal digital assistant or the like.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the apparatus 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any applications or methods operated on the apparatus 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power management system, one or more power sources, and any other components associated with the generation, management, and distribution of power in the apparatus 1000.

The multimedia component 1008 includes a screen providing an output interface between the apparatus 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and the rear camera may receive an external multimedia datum while the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includesa microphone ("MIC") configured to receive an external audio signal when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the apparatus 1000. For instance, the sensor component 1014 may detect an open/closed status of the apparatus 1000, relative positioning of components, e.g., the display and the keypad, of the apparatus 1000, a change in position of the apparatus 1000 or a component of the apparatus 1000, a presence or absence of user contact with the apparatus 1000, an orientation or an acceleration/deceleration of the apparatus 1000, and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The apparatus 1000 can access a wireless network based on a communication standard, such as WiFi, 2G or 3G or a combination thereof. In one embodiment, the communication component 1016 receives a broadcast signal or broadcast associated information from an external broadcast management system via a broadcast channel. In one embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1000 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combiantion with the other hardware or software components for performing the above described methods. The one or more modules disclosed above may be implemented at least partially using the one or more circuitries.

In an embodiment, there is also provided a non-transitory computer readable storage medium including instructions, such as included in the memory 1004, executable by the processor 1020 in the apparatus 1000, for performing the above-described methods. For example, the non-transitory computer-readable storage medium may be a ROM, a RAM, a CD-ROM, a magnetic tape, a floppy disc, an optical data storage device, and the like.

There is provided a non-transitory computer-readable storage medium having stored therein instructions that, when executed by a processor of a mobile terminal, cause the apparatus 1000 to perform all or part of the steps of the method executed by the user terminal shown in FIG. 3, 4A or 5A.

Figure 11:
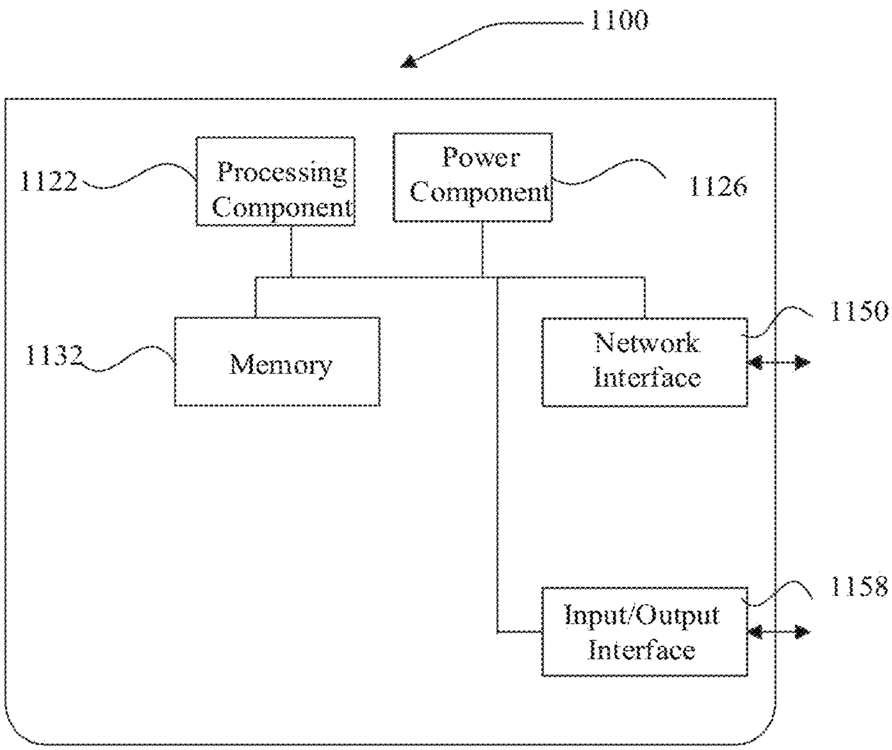
FIG. 11 is a block view showing a smart device control apparatus according to yet another embodiment.

FIG. 11 is a block view showing a smart device control apparatus 1100 according to yet another embodiment. For example, the apparatus 1100 may be provided as a server. As shown in FIG. 11, the apparatus 1100 includes a processing component 1122 which further includes one or more processors, and memory resources represented by a memory 1132 for storing instructions executable by the processing component 1122 such as application. The applications stored in the memory 1132 may include one or more modules, each corresponding to a set of instructions. The processing component 1122 is configured to execute instructions so as to perform all or part of the steps of the method executed by the control device or server shown in FIG. 2, 4A or 5A.

The apparatus 1100 may also include a power component 1126 which is configured to execute power management for the apparatus 1100, a wired or wireless network interface 1150 which is configured to connect the apparatus 1100 to a network, and an input/output (I/O) interface 1158. The apparatus 1100 can operate the operation system stored in the memory 1132, for example, Windows Server™, Mac OS X™, Unix™, Linux™, Free BSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling smart devices by a control device, comprising:

sending, by the control device, to an instruction sending device, identifications of one or more smart devices connected to the control device; wherein the instruction sending device determines types of the smart devices connected to the control device based on the received identifications of the smart devices; and wherein the instruction sending device combines working mode information corresponding to the types of the smart devices connected to the control device into a set of working mode information;

receiving, by the control device, from the instruction sending device, a control instruction including the set of working mode information; and setting, by the control device, a working mode of a target smart device connected to the control device via a local area network (LAN), based on the set of working mode information.

2. The method of claim 1, further comprising:

querying, by the control device, one or more smart devices connected to the control device before receiving the control instruction sent by the instruction sending device.

3. The method of claim 1, further comprising:

before setting the working mode of the target smart device based on the set of working mode information, determining by the control device whether the control device has an authorization to set the working mode of the target smart device; and when determining that the control device has the authorization to set the working mode of the target smart device, setting by the control device the working mode of the target smart device based on the set of working mode information.

4. The method of claim 1, wherein the control device is a router, and the instruction sending device is a server or a user terminal.

5. A method for controlling smart devices by an instruction sending device, comprising:

receiving, by the instruction sending device, identifications of one or more smart devices connected to a control device, the identifications being sent by the control device;

determining, by the instruction sending device, types of the smart devices connected to the control device based on the received identifications of the smart devices;

combining, by the instruction sending device, working mode information corresponding to the types of the smart devices connected to the control device into a set of working mode information;

receiving, by the instruction sending device, an instruction of setting a working mode of a target smart device; and sending, by the instruction sending device, a control instruction including the set of working mode information to the control device, wherein the control device sets a working mode of the target smart device connected to the control device via a local area network (LAN), based on the set of working mode information.

6. The method of claim 5, further comprising:

before receiving the instruction of setting the working mode of the target smart device, displaying by the instruction sending device a mode information setting interface; and receiving, by the instruction sending device, working mode information of different smart device types set in the mode information setting interface, and recording by the instruction sending device working modes of the different smart device types set by a user.

7. The method of claim 5, wherein the control device is a router, and the instruction sending device is a server or a user terminal.

8. A control device, comprising:

a processor; and a memory storing instructions executable by the processor, wherein the processor is configured to:

send, to an instruction sending device, identifications of one or more smart devices connected to the control device; wherein the instruction sending device determines types of the smart devices connected to the control device based on the received identifications of the smart devices; and wherein the instruction sending device combines working mode information corresponding to the types of the smart devices connected to the control device into a set of working mode information;

receive a control instruction sent by the instruction sending device and including the set of working mode information; and set a working mode of a target smart device connected to the control device via a local area network (LAN), based on the set of working mode information.

9. The control device of claim 8, wherein the processor is further configured to:

query one or more smart devices connected to the control device before receiving the control instruction sent by the instruction sending device.

10. The control device of claim 8, wherein the processor is further configured to:

before setting the working mode of the target smart device based on the set of working mode information, determine whether the control device has an authorization to set the working mode of the target smart device; and if the control device has the authorization to set the working mode of the target smart device, set the working mode of the target smart device based on the set of working mode information.

11. The control device of claim 8, wherein the control device is a router, and the instruction sending device is a server or a user terminal.

* * * * *